April 27, 1965  J. LINKE  3,180,224
ROCKET CONTAINERS

Filed Jan. 28, 1963  3 Sheets-Sheet 1

Johannes Linke
Inventor

By Wenderoth, Lind + Ponack
Attorneys

April 27, 1965  J. LINKE  3,180,224
ROCKET CONTAINERS
Filed Jan. 28, 1963  3 Sheets-Sheet 3
Fig. 3
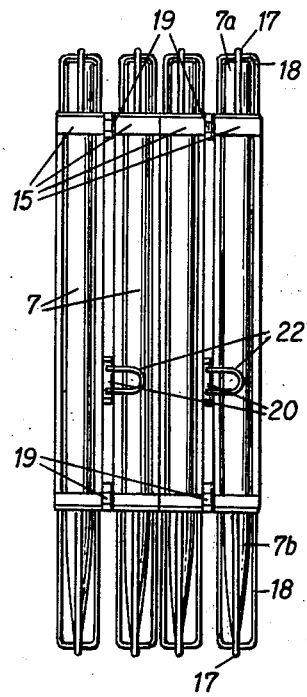
Fig. 4
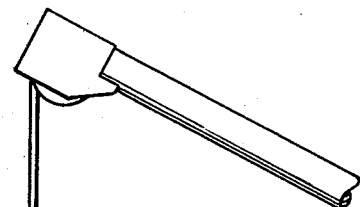
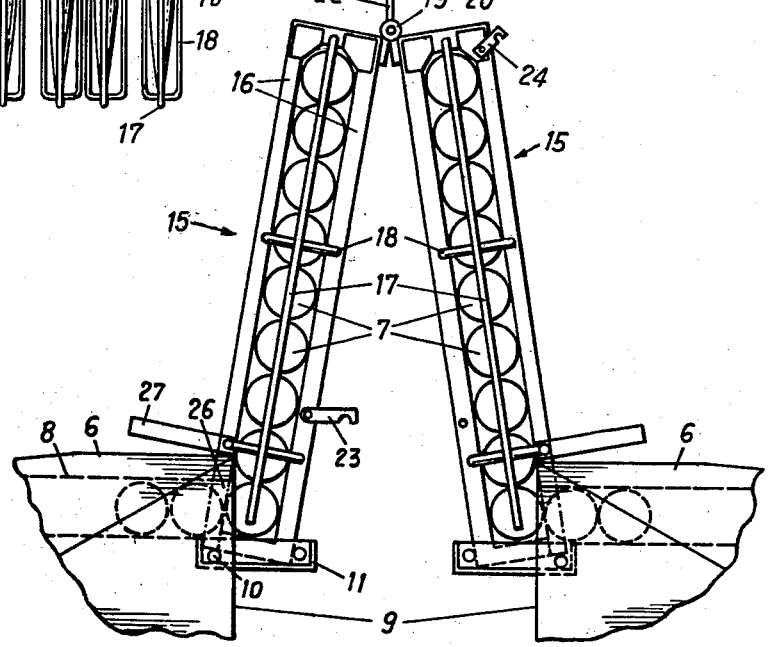

United States Patent Office 3,180,224
Patented Apr. 27, 1965

3,180,224
ROCKET CONTAINERS
Johannes Linke, Zurich, Switzerland, assignor to Machine Tool Works Oerlikon, Administration Company, Zurich-Oerlikon, Switzerland
Filed Jan. 28, 1963, Ser. No. 254,275
Claims priority, application Switzerland, Jan. 31, 1962, 1,178/62
2 Claims. (Cl. 89—1.7)

The invention relates to a rocket container. The present invention has for its object to provide a rocket container specially adapted for the charging with rockets of rocket launchers in twin arrangement. According to my invention the rocket container comprises two part-containers pivotally connected to one another at one end ad each containing rockets in a row.

In the accompanying drawings an embodiment of the invention is illustrated by way of example, wherein:

FIG. 3 shows a detail of FIG. 2 on a larger scale;

FIG. 4 shows a detail of FIG. 1 on a larger scale.

Figure 1:
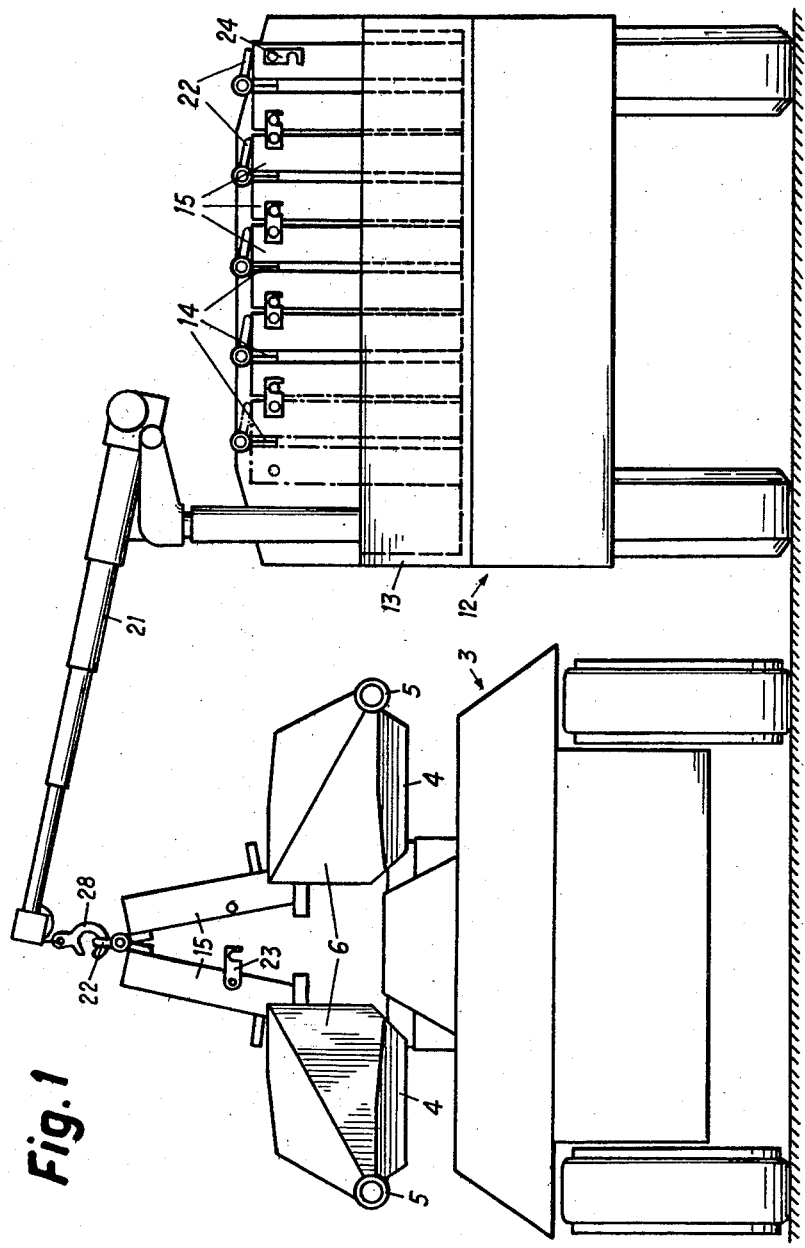
FIG. 1 shows an armoured fighting vehicle and a transport vehicle in elevation.
Figure 2:
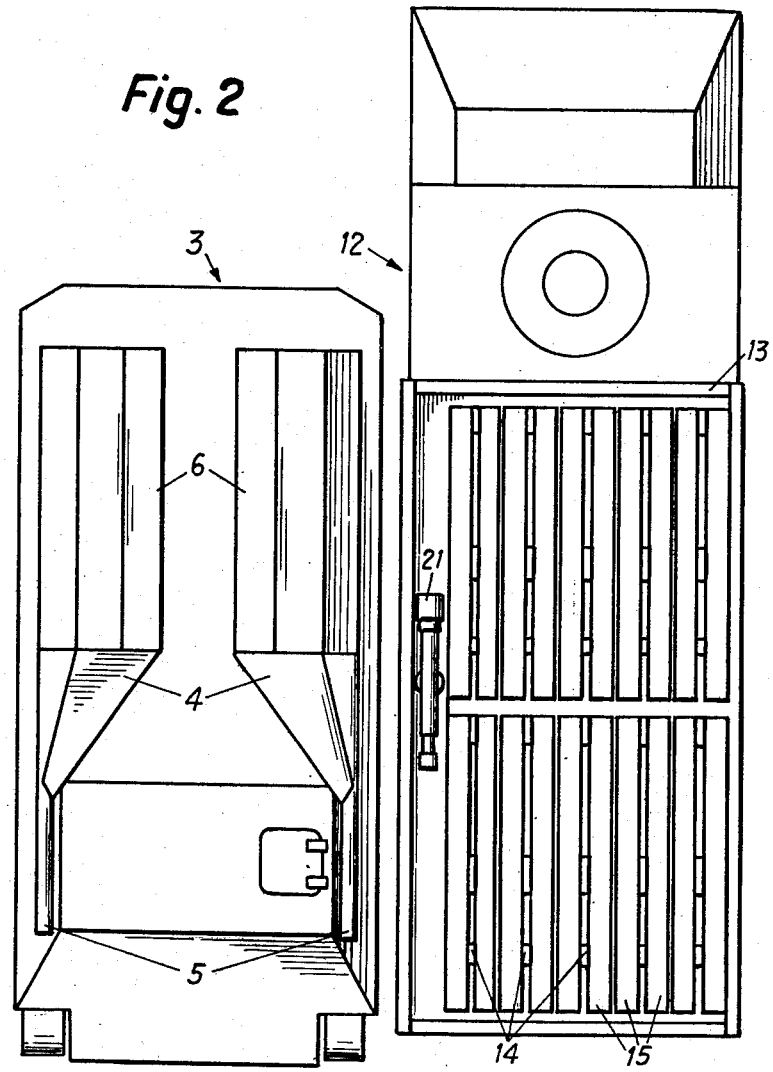
FIG. 2 is a plan view of the vehicles shown in FIG. 1.

According to FIGS. 1 and 2, on the armoured fighting vehicle two rocket firing appliances, so-called rocket launchers each denoted by 4, are mounted with their launching tubes 5 in twin arrangement. The store of rockets 7 contained in magazines 6 of these launchers is for example stored in loop arrangements. In FIG. 4 the ducts 8, which take in the uppermost layer of the rocket store, are indicated in dotted lines. These ducts 8, which issue into opposite walls 9 of the magazine 6, are to be closed by lids 11 hinged about pivot points 10.

The vehicle 12 illustrated in the drawings serves for the transport of the rockets 7 intended as the ammunition for the fighting vehicle 3. This vehicle 12 carries a trough-shaped superstructure 13, which contains two rows of rocket containers 14 standing upright one behind the other. As the figures moreover show, two part-containers 15 forming together a rocket container 14 are each formed as a parallelepipedon, the edges of which are constituted by U-profile rolled sections 16. The inner clear width of these part-containers 15 corresponds to the diameter of the rockets 7 stored therein in row arrangement while the length thereof is kept slightly shorter than that of the same. The rear ends 7a and the tips 7b of the rockets 7 lie outside the part-container 15 proper, but are held by longitudinal yokes 17, which are connected therewith and are reinforced by transverse yokes 18 likewise fixed to the container.

As will be further seen in the figures, any pair of part-containers 15 are pivotally connected at their upper ends by means of hinges 19 and 20 attached thereto. On the middle hinge 20, which is located above the centre of gravity of a container 14, moreover a carrier eyelet 22 is attached for being engaged by the hook of a crane. During transport the lower ends of these pairs of part-containers 15 are held together by means of a latch 23. Likewise any two neighbouring pairs of part-containers are coupled with one another by means of a coupling latch 24. The outer rolled sections constructed as vertical corner profiles 25 do not extend to the lower end of a part-container 15. Through the aperture 26 thus formed, the rockets may be inserted into the part-container, or may be discharged from the same. The aperture 26 is capable of being closed for transport purposes by two flaps 27 or by unilaterally detachable holder straps enclosing the lowermost rockets. The transport vehicle is provided with a slewing crane 21.

For the loading of the fighting vehicle 3 with ammunition, the transport vehicle 12 drives alongside the same, as shown in the FIGURES 1 and 2. The crane 21, after its hook 28 has engaged into the carrier eyelet 22, and after the detaching of the coupling latches 24, lifts a rocket container 14 out of the trough 13 and swings the same into the plane of symetry of the fighting vehicle 3. In this position the latch 23 is opened and moreover the aperture 26 is cleared by the flaps 27 or holder straps. The two part-containers 15 are spread apart and lowered on to the lids 11 of the magazine duct 8 which has been molded down in order to clear said aperture. The lowermost rocket is then pushed mechanically or by hand from the inner side out of the part-container 15 into the magazine duct 8, where it is engaged by conveyer means (not shown in the drawings) and is moved on. Likewise also the other rockets following by sliding down are conveyed into the magazine 6. After the discharging of the two part-containers 15, the container 14 is replaced on the transport vehicle, and, according to requirements, further full containers 14 are taken from it and discharged into the magazines 6 of the launchers 4 until they are completely loaded.

What I claim as my invention and desire to secure by Letters Patent, is:

1. A rocket launching system comprising in combination two rocket launchers in twin arrangement with spaced apart walls opposite to each other and having duct ducts forming a rocket magazine in each of said launchers, a transportable rocket container having two part-containers and a horizontal hinge pivotally connecting the upper ends of said part-containers which are adapted by said hinge to be spread out into a charging position, said ducts forming an aperture each in said walls for charging said magazines with rockets, each of said part containers in operation containing rockets in a row and having closable openings on its lower end for the passing of rockets, part-container receiving means attached at each of said walls adjacent to said aperture to receive said lower end of each of said part-containers in said charging position of said part-containers and to align said aperture with one of said openings.

2. A rocket launching system as set forth in claim 1 wherein each of said part-container receiving means comprises a lid pivoted on the adjacent wall below the aperture therein to close said aperture when the magazine is not being charged and when pivoted to open said aperture for charging said magazine receiving the lower end of its associated part-container.

References Cited by the Examiner
UNITED STATES PATENTS

| | | | |
|---|---|---|---|
| 794,663 | 7/05 | Daly | 89—34 |
| 2,960,009 | 11/60 | Hereth et al. | 89—1.7 |
| 2,961,927 | 11/60 | Dufour | 89—34 X |

BENJAMIN A. BORCHELT, *Primary Examiner.*
SAMUEL FEINBERG, *Examiner.*